US011645850B2

(12) United States Patent
Kusumoto et al.

(10) Patent No.: US 11,645,850 B2
(45) Date of Patent: May 9, 2023

(54) INFORMATION PROCESSING METHOD, NON-TRANSITORY COMPUTER READABLE MEDIUM, IN-VEHICLE APPARATUS, VEHICLE, INFORMATION PROCESSING APPARATUS, AND INFORMATION PROCESSING SYSTEM

(71) Applicant: TOYOTA JIDOSHA KABUSHIKI KAISHA, Toyota (JP)

(72) Inventors: Yasuyuki Kusumoto, Nagoya (JP); Yohei Kubo, Toyota (JP); Katsuya Masuda, Nakama (JP); Kohei Hosokawa, Yukuhashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 17/343,124

(22) Filed: Jun. 9, 2021

(65) Prior Publication Data

US 2022/0001866 A1    Jan. 6, 2022

(30) Foreign Application Priority Data

Jul. 1, 2020    (JP) .............................. JP2020-114469

(51) Int. Cl.
*G06V 20/58* (2022.01)
*B60W 30/14* (2006.01)
*B60W 50/14* (2020.01)
*B60R 1/24* (2022.01)
*B60R 1/22* (2022.01)

(52) U.S. Cl.
CPC ......... *G06V 20/582* (2022.01); *B60W 30/146* (2013.01); *B60W 50/14* (2013.01); *B60R 1/22* (2022.01); *B60R 1/24* (2022.01); *B60W 2050/146* (2013.01); *B60W 2420/42* (2013.01); *B60W 2520/10* (2013.01); *B60W 2520/105* (2013.01); *B60W 2555/60* (2020.02); *B60W 2556/45* (2020.02); *B60W 2556/65* (2020.02); *B60W 2756/10* (2020.02)

(58) Field of Classification Search
None
See application file for complete search history.

(56) References Cited

U.S. PATENT DOCUMENTS

| | | | | |
|---|---|---|---|---|
| 9,834,199 B2* | 12/2017 | Yoon | ..................... | B60W 20/12 |
| 9,842,496 B1* | 12/2017 | Hayward | ............. | G05D 1/0214 |
| 9,884,590 B2* | 2/2018 | Park | ........................ | G06T 11/60 |
| 10,046,763 B2* | 8/2018 | Inoue | ..................... | B60W 50/00 |

(Continued)

FOREIGN PATENT DOCUMENTS

| | | | | | |
|---|---|---|---|---|---|
| AU | 2021203221 A1 | * | 6/2021 | .......... | B60W 30/146 |
| CN | 100462836 C | * | 2/2009 | ............... | B60R 1/00 |

(Continued)

*Primary Examiner* — Kevin R Steckbauer
(74) *Attorney, Agent, or Firm* — Oliff PLC

(57) ABSTRACT

An information processing method for a vehicle includes capturing and storing images of an area in front of the vehicle, acquiring information on the speed of the vehicle, and transmitting an image to an information processing apparatus when a judgment is made that a change in speed equal to or greater than a threshold occurs while the vehicle is traveling in a predetermined section, the image being captured during a predetermined period that includes the time when the judgment is made.

13 Claims, 5 Drawing Sheets

(56) References Cited

U.S. PATENT DOCUMENTS

| | | | |
|---|---|---|---|
| 10,055,985 B1* | 8/2018 | Hayward | H04W 4/06 |
| 10,089,870 B2* | 10/2018 | Ro | G08G 1/09623 |
| 10,366,605 B1* | 7/2019 | Hayward | G01C 21/3667 |
| 10,392,001 B2* | 8/2019 | Gaither | B60W 20/11 |
| 10,414,347 B2* | 9/2019 | Wilbert | G06V 20/63 |
| 10,460,185 B2* | 10/2019 | Hall | G06V 20/588 |
| 10,501,015 B2* | 12/2019 | Park | H04N 7/181 |
| 10,553,110 B2* | 2/2020 | Fowe | G08G 1/052 |
| 10,730,450 B2* | 8/2020 | Wilbert | G06V 20/582 |
| 11,117,597 B2* | 9/2021 | Zhu | G05D 1/0214 |
| 11,134,201 B2* | 9/2021 | Xu | G06V 20/58 |
| 11,151,867 B2* | 10/2021 | Huang | G06V 20/58 |
| 11,178,164 B2* | 11/2021 | Sasaki | G08G 1/0116 |
| 11,208,125 B2* | 12/2021 | Thiyagarajan | B61L 27/14 |
| 11,227,493 B2* | 1/2022 | Han | B60R 1/00 |
| 11,380,197 B2* | 7/2022 | Sasaki | G07C 5/0808 |
| 11,403,902 B2* | 8/2022 | Ho | H04L 65/1069 |
| 11,423,777 B2* | 8/2022 | Hata | G06V 10/75 |
| 2016/0117922 A1* | 4/2016 | Oh | G01C 21/3691 348/118 |
| 2016/0167641 A1* | 6/2016 | Yoon | G08G 1/09623 903/903 |
| 2016/0332574 A1* | 11/2016 | Park | G06T 11/60 |
| 2016/0347313 A1* | 12/2016 | Inoue | B60W 30/146 |
| 2017/0124788 A1* | 5/2017 | Nishida | G07C 5/0866 |
| 2017/0132920 A1* | 5/2017 | Xu | G08G 1/162 |
| 2017/0148320 A1* | 5/2017 | Ro | G08G 1/0967 |
| 2017/0206887 A1* | 7/2017 | Wilbert | G06V 20/582 |
| 2018/0154832 A1* | 6/2018 | Park | H04N 23/90 |
| 2018/0374346 A1* | 12/2018 | Fowe | G08G 1/0112 |
| 2019/0047545 A1* | 2/2019 | Gaither | B60W 30/143 |
| 2019/0161108 A1* | 5/2019 | Thiyagarajan | B61L 3/008 |
| 2019/0236382 A1* | 8/2019 | Hall | G01C 21/3469 |
| 2019/0271550 A1* | 9/2019 | Breed | G08G 1/205 |
| 2019/0359148 A1* | 11/2019 | Wilbert | B60Q 5/005 |
| 2020/0010095 A1* | 1/2020 | Kim | B60W 10/20 |
| 2020/0051434 A1* | 2/2020 | Sasaki | H04L 12/4625 |
| 2020/0053113 A1* | 2/2020 | Sasaki | G08G 1/0116 |
| 2020/0108717 A1* | 4/2020 | Kim | B60W 50/0097 |
| 2020/0143671 A1* | 5/2020 | Fowe | G08G 1/0129 |
| 2020/0184812 A1* | 6/2020 | Han | G08G 1/09623 |
| 2020/0349833 A1* | 11/2020 | Lerner | G08G 1/0125 |
| 2020/0361485 A1* | 11/2020 | Zhu | G05D 1/0246 |
| 2021/0009161 A1* | 1/2021 | Kim | G01C 21/34 |
| 2021/0024084 A1* | 1/2021 | Kim | G08G 1/096725 |
| 2021/0058555 A1* | 2/2021 | Xu | B60W 30/0953 |
| 2021/0078598 A1* | 3/2021 | Kim | G08G 1/0125 |
| 2021/0150895 A1* | 5/2021 | Huang | G06V 20/56 |
| 2021/0261149 A1* | 8/2021 | Doi | B60W 30/18154 |
| 2021/0354557 A1* | 11/2021 | Chun | B60W 30/143 |
| 2022/0001866 A1* | 1/2022 | Kusumoto | B60W 30/146 |
| 2022/0119020 A1* | 4/2022 | Thiyagarajan | B61L 27/14 |
| 2022/0204026 A1* | 6/2022 | Kim | G05D 1/02 |
| 2022/0214176 A1* | 7/2022 | Kim | B60W 40/06 |
| 2022/0283579 A1* | 9/2022 | Hu | G05D 1/0011 |
| 2022/0324437 A1* | 10/2022 | Blau | G01S 17/58 |
| 2022/0327719 A1* | 10/2022 | Shaag | G01C 21/3885 |
| 2022/0332349 A1* | 10/2022 | Benou | G01C 21/00 |
| 2022/0333927 A1* | 10/2022 | Rosenblum | B60W 10/18 |
| 2022/0333932 A1* | 10/2022 | Rosenblum | G01S 17/58 |
| 2022/0351526 A1* | 11/2022 | Bar Zvi | B60W 10/04 |
| 2022/0368582 A1* | 11/2022 | Pfadler | H04L 27/2602 |

FOREIGN PATENT DOCUMENTS

| | | | | |
|---|---|---|---|---|
| CN | 105691383 A | * | 6/2016 | B60K 6/20 |
| CN | 106056697 A | * | 10/2016 | G07C 5/008 |
| CN | 106157660 A | * | 11/2016 | B60K 35/00 |
| CN | 106515732 A | * | 3/2017 | B60W 30/146 |
| CN | 106627574 A | * | 5/2017 | B60Q 9/00 |
| CN | 106056697 B | * | 12/2018 | G07C 5/008 |
| CN | 109177900 A | * | 1/2019 | |
| CN | 105691383 B | * | 4/2019 | B60K 6/20 |
| CN | 106157660 B | * | 5/2019 | B60K 35/00 |
| CN | 110053577 A | * | 7/2019 | |
| CN | 110316198 A | * | 10/2019 | |
| CN | 110329151 A | * | 10/2019 | B60P 3/11 |
| CN | 110356391 A | * | 10/2019 | B60R 1/00 |
| CN | 107133568 B | * | 11/2019 | G06K 9/00818 |
| CN | 111002982 A | * | 4/2020 | B60K 31/18 |
| CN | 111247495 A | * | 6/2020 | B60R 21/0134 |
| CN | 106515732 B | * | 7/2020 | B60W 30/146 |
| CN | 112070039 A | * | 12/2020 | |
| CN | 110329151 B | * | 8/2021 | B60P 3/11 |
| CN | 113561975 A | * | 10/2021 | B60K 31/0058 |
| CN | 113924462 A | * | 1/2022 | B60W 60/001 |
| CN | 114093053 A | * | 2/2022 | B60W 30/146 |
| CN | 110325410 B | * | 4/2022 | G08G 1/0116 |
| CN | 114787888 A | * | 7/2022 | G05D 1/0011 |
| CN | 114930123 A | * | 8/2022 | B60W 60/001 |
| DE | 102012203505 A1 | * | 9/2012 | G08G 1/09623 |
| DE | 102016109395 A1 | * | 12/2016 | B60K 31/00 |
| DE | 102016216827 A1 | * | 3/2017 | B60W 30/146 |
| DE | 102016222592 A1 | * | 5/2017 | G01C 21/3492 |
| DE | 112016003429 T5 | * | 5/2018 | B60R 1/00 |
| DE | 102016109395 B4 | * | 1/2021 | B60K 31/00 |
| DE | 102020206256 A1 | * | 12/2021 | |
| DE | 102021114820 A1 | * | 1/2022 | B60W 30/146 |
| DE | 112020002869 T5 | * | 3/2022 | B60W 60/001 |
| EP | 3069920 A1 | * | 9/2016 | B60K 6/20 |
| EP | 3094087 A1 | * | 11/2016 | B60R 1/00 |
| EP | 3418997 A1 | * | 12/2018 | G06K 9/00818 |
| EP | 3744582 A1 | * | 12/2020 | G08G 1/0116 |
| EP | 3744583 A1 | * | 12/2020 | B60W 60/00188 |
| EP | 3048584 B1 | * | 7/2021 | G01C 21/3667 |
| EP | 3069920 B1 | * | 10/2021 | B60K 6/20 |
| EP | 3744582 B1 | * | 1/2022 | G08G 1/0116 |
| ES | 2900828 T3 | * | 3/2022 | G01C 21/3667 |
| JP | 5472163 B2 | * | 4/2014 | G08G 1/09623 |
| JP | 2019-101806 A | | 6/2019 | |
| JP | 2019101806 A | * | 6/2019 | |
| JP | 2019129527 A | * | 8/2019 | G08G 1/0116 |
| JP | 2019129529 A | * | 8/2019 | B60W 60/00188 |
| JP | 2022012553 A | * | 1/2022 | B60W 30/146 |
| WO | WO-2009036848 A2 | * | 3/2009 | B60R 1/00 |
| WO | WO-2009131305 A2 | * | 10/2009 | B60R 1/00 |
| WO | WO-2018017793 A1 | * | 1/2018 | B60N 2/00 |
| WO | WO-2019142475 A1 | * | 7/2019 | G08G 1/0116 |
| WO | WO-2020110217 A1 | * | 6/2020 | G03F 1/00 |
| WO | WO-2020235813 A1 | * | 11/2020 | B60W 60/001 |
| WO | WO-2020235814 A1 | * | 11/2020 | B60W 60/001 |
| WO | WO-2021136967 A2 | * | 7/2021 | B60W 60/001 |
| WO | WO-2021138616 A1 | * | 7/2021 | B60W 10/04 |
| WO | WO-2021138619 A2 | * | 7/2021 | B60W 60/0016 |
| WO | WO-2021261058 A1 | * | 12/2021 | G05D 1/0011 |
| WO | WO-2022016044 A1 | * | 1/2022 | |
| WO | WO-2022149046 A1 | * | 7/2022 | G01C 21/3815 |
| WO | WO-2022229704 A2 | * | 11/2022 | B60W 10/04 |

\* cited by examiner

US 11,645,850 B2

INFORMATION PROCESSING METHOD, NON-TRANSITORY COMPUTER READABLE MEDIUM, IN-VEHICLE APPARATUS, VEHICLE, INFORMATION PROCESSING APPARATUS, AND INFORMATION PROCESSING SYSTEM

CROSS-REFERENCE TO RELATED APPLICATION

This application claims priority to Japanese Patent Application No. 2020-114469, filed on Jul. 1, 2020, the entire contents of which are incorporated herein by reference.

TECHNICAL FIELD

The present disclosure relates to an information processing method, a program, an in-vehicle apparatus, a vehicle, an information processing apparatus, and an information processing system.

BACKGROUND

Technology for transmitting images, captured while a vehicle is traveling, to a data center or the like and storing the images in the data center is known. For example, see patent literature (PTL) 1.

CITATION LIST

Patent Literature

PTL 1: JP 2019-101806 A

SUMMARY

Transmitting all of the images captured while a vehicle is traveling leads to a large communication load. Furthermore, if all of the images captured while the vehicle is traveling are transmitted, a large amount of image data needs to be stored in a data center or the like.

Technology for transmitting images captured while a vehicle is traveling has room for improvement.

It would be helpful to improve technology for transmitting images captured while a vehicle is traveling.

An information processing method according to the present disclosure is an information processing method for a vehicle and includes capturing and storing images of an area in front of the vehicle, acquiring information on a speed of the vehicle, and transmitting an image to an information processing apparatus when a judgment is made that a change in speed equal to or greater than a threshold occurs while the vehicle is traveling in a predetermined section, the image being captured during a predetermined period that includes a time when the judgment is made.

A program according to the present disclosure is configured to cause an in-vehicle apparatus mounted in a vehicle to execute operations including capturing and storing images of an area in front of the vehicle, acquiring information on a speed of the vehicle, and transmitting an image to an information processing apparatus when a judgment is made that a change in speed equal to or greater than a threshold occurs while the vehicle is traveling in a predetermined section, the image being captured during a predetermined period that includes a time when the judgment is made.

An information processing method according to the present disclosure is an information processing method for an information processing apparatus configured to communicate with a vehicle and includes performing image analysis, upon receiving an image of an area in front of the vehicle from the vehicle, as to whether a road sign is included in the image.

A program according to the present disclosure is configured to cause an information processing apparatus configured to communicate with a vehicle to execute operations including performing image analysis, upon receiving an image of an area in front of the vehicle from the vehicle, as to whether a road sign is included in the image.

An in-vehicle apparatus according to the present disclosure includes a memory configured to store images, captured by an imaging apparatus mounted in a vehicle, of an area in front of the vehicle, a receiver configured to receive information on a speed of the vehicle, and a controller configured to judge whether a change in speed equal to or greater than a threshold occurs while the vehicle is traveling in a predetermined section. When a judgment is made that a change in speed equal to or greater than the threshold occurs, the controller transmits an image captured during a predetermined period that includes a time when the judgment is made to an information processing apparatus.

An information processing apparatus according to the present disclosure includes a communication interface configured to communicate with a vehicle and a controller configured to perform image analysis, upon acquiring an image of an area in front of the vehicle from the vehicle via the communication interface, as to whether a road sign is included in the image.

According to the present disclosure, technology for transmitting images captured while a vehicle is traveling can be improved.

DETAILED DESCRIPTION

An embodiment of the present disclosure is described below with reference to the drawings.

Figure 1:
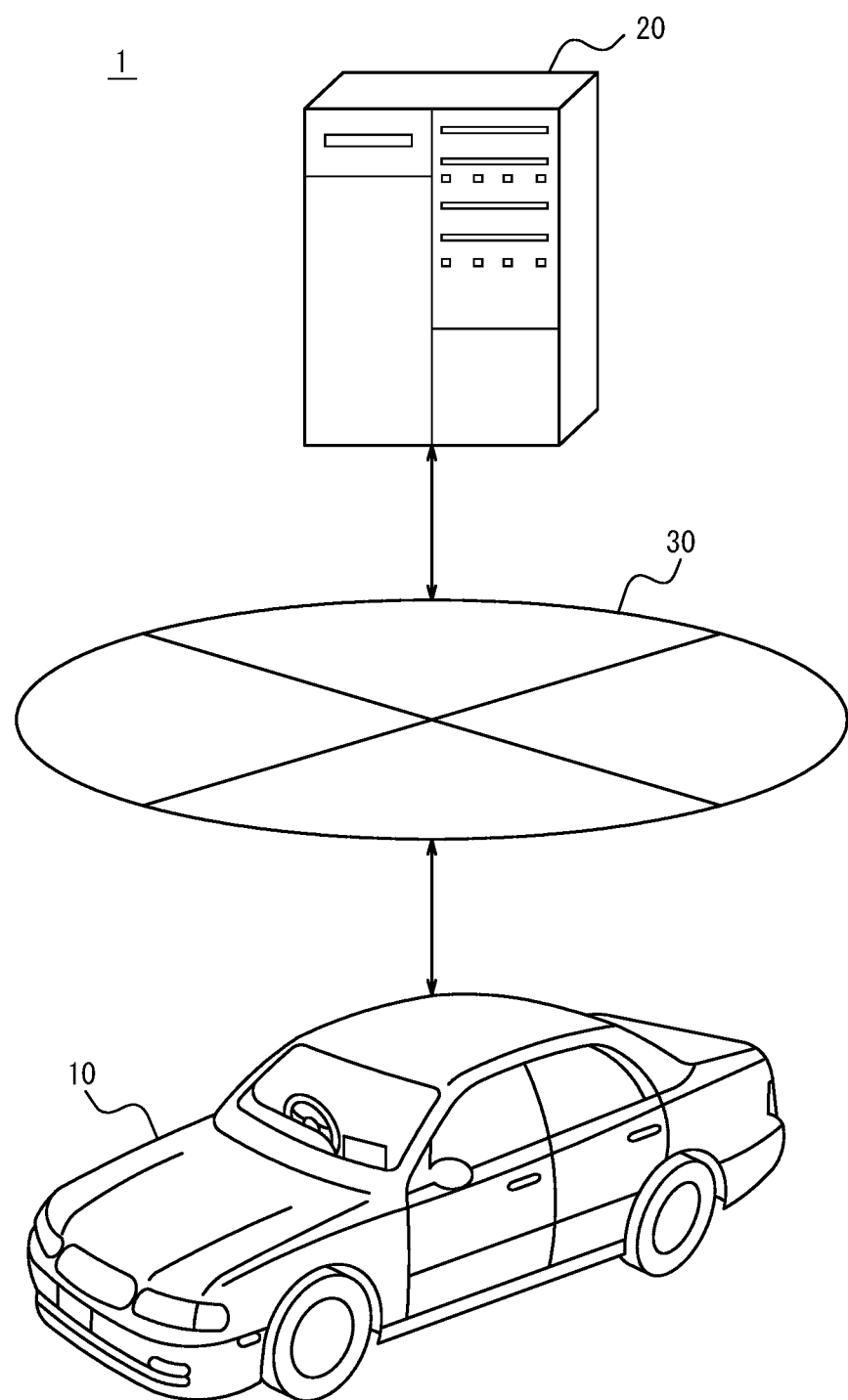
FIG. 1 is a diagram illustrating a configuration of an information processing system according to an embodiment of the present disclosure.

FIG. 1 is a diagram illustrating a configuration of an information processing system 1 according to an embodiment of the present disclosure. The configuration and outline of the information processing system 1 according to an embodiment of the present disclosure are described with reference to FIG. 1.

The information processing system 1 includes a vehicle 10 and an information processing apparatus 20. The vehicle 10 and the information processing apparatus 20 are communicably connected via a network 30. The network 30 may be a network including a mobile communication network, the Internet, and the like.

In FIG. 1, one each of the vehicle 10 and the information processing apparatus 20 are illustrated, but the number of vehicles 10 and information processing apparatuses 20 may be two or more of each.

The vehicle 10 is any type of automobile such as a gasoline-powered vehicle, a diesel-powered vehicle, a hybrid vehicle (HV), a plug-in hybrid vehicle (PHV), an electric vehicle (EV), or a fuel cell vehicle (FCV). The vehicle 10 is driven by a driver in the present embodiment, but the driving may be automated at any level. The level of automation is, for example, one of level 1 to level 5 in the level classification of the Society of Automotive Engineers (SAE). The vehicle 10 may be a dedicated Mobility as a Service (MaaS) vehicle.

The vehicle 10 continuously captures images of the area in front of the vehicle 10 during travel. The vehicle 10 captures images of the area in front of the vehicle 10 so that a road sign ahead appears in the images. Rather than transmitting all of the captured images to the information processing apparatus 20, the vehicle 10 transmits a captured image to the information processing apparatus 20 only when a predetermined condition is satisfied.

The predetermined condition for the vehicle 10 to transmit the captured image to the information processing apparatus 20 may be that the vehicle 10 is traveling in a predetermined section, and a change in speed of a predetermined threshold or greater has occurred. Here, the "predetermined section" is a section in which a dynamic sign is installed. The "dynamic sign" is a road sign with variable display content. The dynamic sign may be a road sign with a variable display of the speed limit. If the display of the speed limit on this dynamic sign changes from 80 km/h to 50 km/h, for example, the driver depresses the brake, causing the vehicle 10 to decelerate greatly. In such cases, the vehicle 10 transmits, to the information processing apparatus 20, images captured during a predetermined period that includes the time when it is judged that a change in speed of a predetermined threshold or greater has occurred. This enables the vehicle 10 to transmit images including the dynamic sign whose display content changed to the information processing apparatus 20.

The information processing apparatus 20 is, for example, a dedicated computer configured to function as a server. The information processing apparatus 20 may be a general-purpose personal computer (PC). The information processing apparatus 20 can communicate with the vehicle 10 via the network 30.

The information processing apparatus 20 receives images, from the vehicle 10, captured while the vehicle 10 is traveling. The images received by the information processing apparatus 20 are images transmitted by the vehicle 10 when the predetermined condition is satisfied.

Upon receiving an image from the vehicle 10, the information processing apparatus 20 performs image analysis on the received image. The information processing apparatus 20 judges, by image analysis, whether the display content of the dynamic sign included in the received image has changed. If the display content of the dynamic sign has changed, the information processing apparatus 20 may communicate to a plurality of vehicles 10, via the network 30, that the display content of the dynamic sign has changed.

The plurality of vehicles 10 includes the vehicle 10 that has been transmitting images and other vehicles 10.

Figure 2:
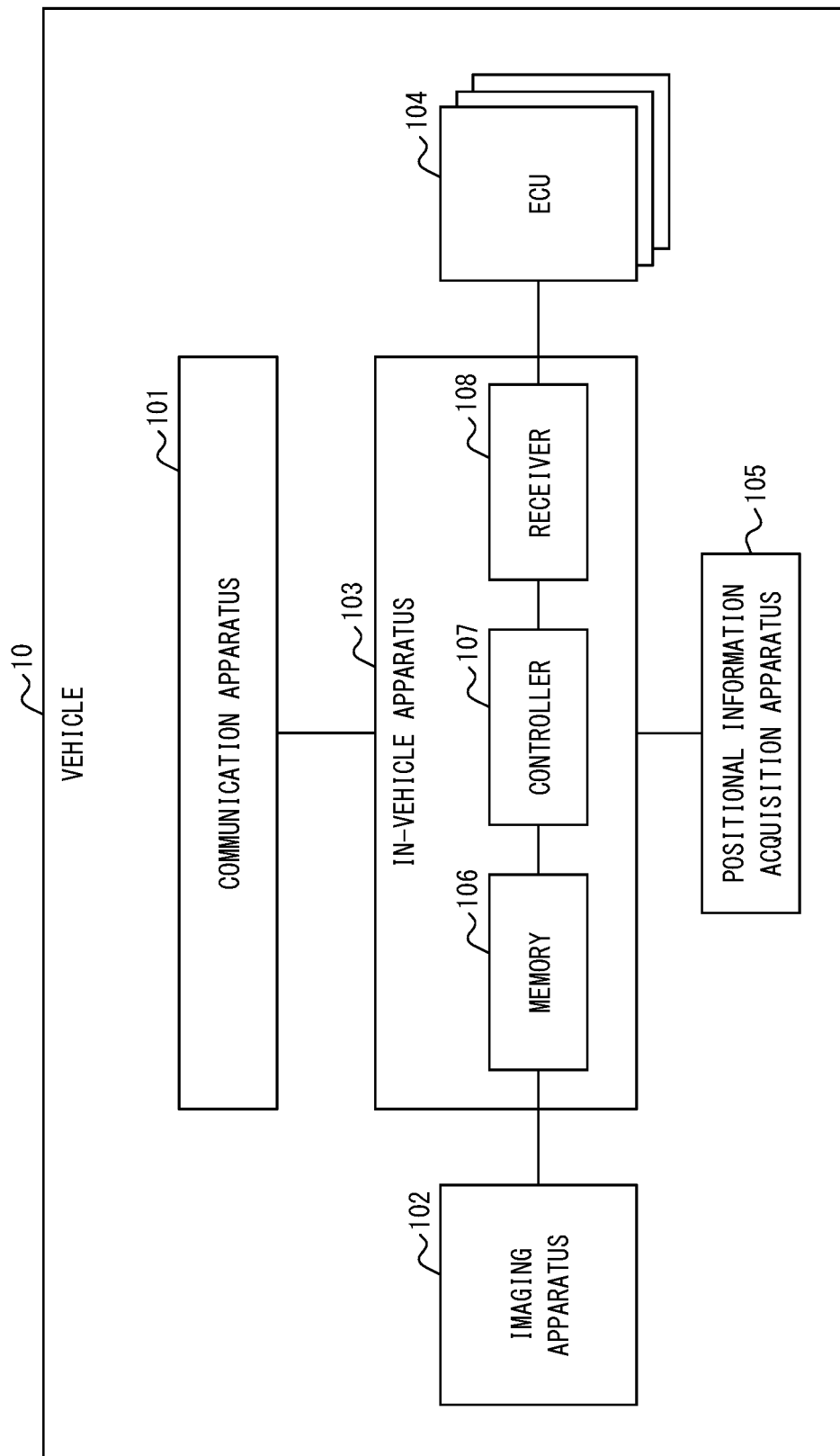
FIG. 2 is a block diagram illustrating a configuration of a vehicle according to an embodiment of the present disclosure.

The configuration of the vehicle 10 according to an embodiment of the present disclosure is described with reference to FIG. 2.

The vehicle 10 includes a communication apparatus 101, an imaging apparatus 102, an in-vehicle apparatus 103, a plurality of electronic control units (ECUs) 104, and a positional information acquisition apparatus 105. The communication apparatus 101, the imaging apparatus 102, the in-vehicle apparatus 103, the plurality of ECUs 104, and the positional information acquisition apparatus 105 are, for example, communicably connected to each other via an in-vehicle network, such as a controller area network (CAN), or a dedicated line.

The communication apparatus 101 includes a communication module that connects to the network 30. For example, the communication apparatus 101 may include a communication module compliant with mobile communication standards such as long term evolution (LTE) and the 4th generation (4G) and the 5th generation (5G) standards. The vehicle 10 is connected to the network 30 via the communication apparatus 101. The communication apparatus 101 transmits and receives various information via the network 30. The communication apparatus 101 can communicate with the information processing apparatus 20 via the network 30.

The imaging apparatus 102 may, for example, be a camera. The imaging apparatus 102 can capture images of the area in front of the vehicle 10. The imaging apparatus 102 is installed on the vehicle 10 so as to be able to capture images of a road sign in front of the vehicle 10. The imaging apparatus 102 continuously captures images of the area in front of the vehicle 10 while the vehicle 10 is traveling. Although one imaging apparatus 102 is illustrated in FIG. 2, a plurality of imaging apparatuses 102 may be installed in the vehicle 10.

The in-vehicle apparatus 103 includes a memory 106, a controller 107, and a receiver 108. The in-vehicle apparatus 103 may, for example, be a navigation device. Alternatively, the in-vehicle apparatus 103 may, for example, be a multimedia device that includes navigation and audio functions.

The memory 106 is, for example, a semiconductor memory, a magnetic memory, an optical memory, or the like, but is not limited to these. The memory 106 may, for example, function as a main storage device, an auxiliary storage device, or a cache memory. The memory 106 stores any information used for operations of the in-vehicle apparatus 103. For example, the memory 106 may store system programs, application programs, and various information received by the communication apparatus 101. The information stored in the memory 106 may be updated with, for example, information received from the network 30 via the communication apparatus 101. A portion of the memory 106 may be installed externally to the in-vehicle apparatus 103. In that case, the externally installed portion of the memory 106 may be connected to the in-vehicle apparatus 103 via any appropriate interface.

The memory 106 stores images, captured by the imaging apparatus 102, of the area in front of the vehicle 10. The memory 106 may store the images, captured by the imaging apparatus 102, of the area in front of the vehicle 10 only for a predetermined amount of time. For example, the memory 106 may be configured to store only 30 minutes' worth of images captured by the imaging apparatus 102. In this case, upon acquiring a new image exceeding the 30 minutes' worth of images from the imaging apparatus 102, the memory 106 erases the oldest image and stores the new image.

The controller 107 includes at least one processor, at least one dedicated circuit, or a combination thereof. The processor is a general-purpose processor, such as a central processing unit (CPU) or a graphics processing unit (GPU), or a dedicated processor specialized for particular processing. The dedicated circuit is, for example, a field-programmable gate array (FPGA) or an application specific integrated circuit (ASIC). The controller 107 executes processes related to the operations of the in-vehicle apparatus 103 while controlling each part of the in-vehicle apparatus 103.

The receiver 108 receives various types of vehicle information relating to the vehicle 10 from the plurality of ECUs 104.

Each ECU 104 among the plurality of ECUs 104 collects various types of vehicle information relating to the vehicle 10 from various sensors mounted in the vehicle 10. The ECU 104 transmits the collected vehicle information to the receiver 108.

The vehicle information collected by the ECU 104 includes, for example, speed, acceleration, position, headlight status, autonomous driving status, information regarding the road on which the vehicle 10 is traveling, and the like.

The positional information acquisition apparatus 105 includes at least one receiver corresponding to any appropriate satellite positioning system. For example, the positional information acquisition apparatus 105 may include a global positioning system (GPS) receiver. The positional information acquisition apparatus 105 acquires the measured value of the position of the vehicle 10 as the positional information. The positional information includes, for example, an address, a latitude, a longitude, an altitude, and the like.

Figure 3:
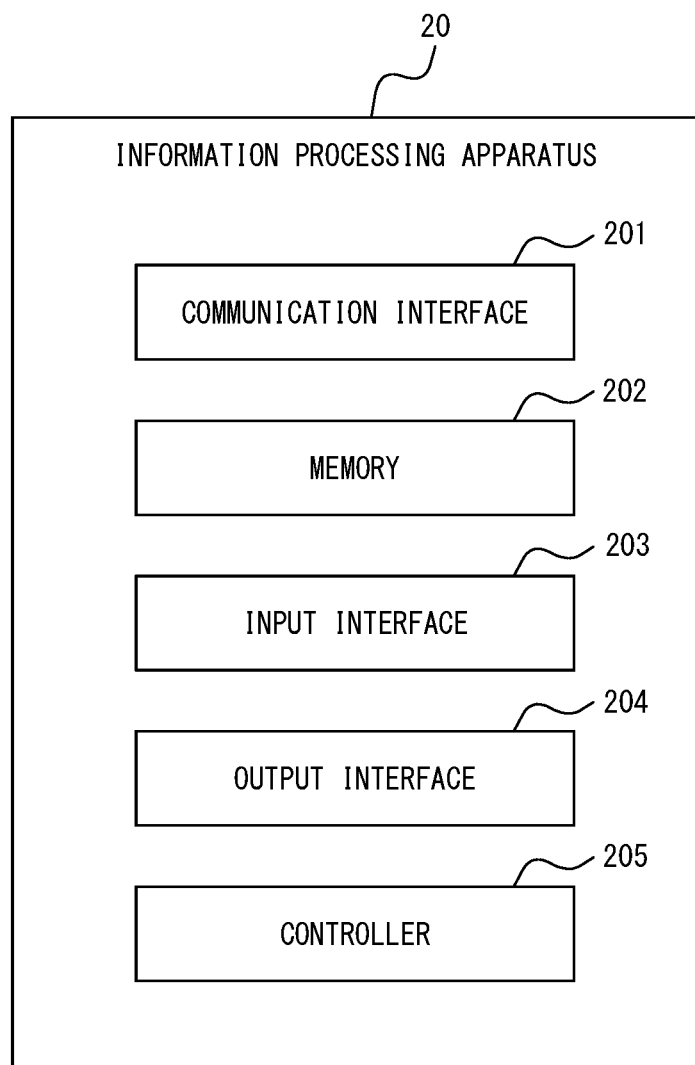
FIG. 3 is a block diagram illustrating a configuration of an information processing apparatus according to an embodiment of the present disclosure.

A configuration of the information processing apparatus 20 according to an embodiment of the present disclosure is described with reference to FIG. 3.

The information processing apparatus 20 includes a communication interface 201, a memory 202, an input interface 203, an output interface 204, and a controller 205.

The communication interface 201 includes a communication module connected to the network 30. For example, the communication interface 201 may include a communication module corresponding to a local area network (LAN). The information processing apparatus 20 is connected to the network 30 via the communication interface 201. The communication interface 201 transmits and receives various information via the network 30. The communication interface 201 can communicate with the vehicle 10 via the network 30.

The memory 202 is, for example, a semiconductor memory, a magnetic memory, an optical memory, or the like, but is not limited to these. The memory 202 may, for example, function as a main storage device, an auxiliary storage device, or a cache memory. The memory 202 stores any information used for operations of the information processing apparatus 20. For example, the memory 202 may store a system program, an application program, various types of information received by the communication interface 201, and the like. The information stored in the memory 202 may be updated with, for example, information received from the network 30 via the communication interface 201. A portion of the memory 202 may be installed externally to the information processing apparatus 20. In that case, the externally installed portion of the memory 202 may be connected to the information processing apparatus 20 via any appropriate interface.

The input interface 203 includes one or more input interfaces for detecting user input and acquiring input information based on user operation. For example, the input interface 203 includes, but is not limited to, a physical key, a capacitive key, a touch screen integrally provided with a display of the output interface 204, or a microphone that accepts audio input.

The output interface 204 includes one or more output interfaces for outputting information to notify the user. For example, the output interface 204 includes, but is not limited to, a display for outputting information as video or a speaker for outputting information as audio.

The controller 205 includes at least one processor, at least one dedicated circuit, or a combination thereof. The processor is a general-purpose processor, such as a CPU or a GPU, or a dedicated processor that is dedicated to specific processing. The dedicated circuit is, for example, an FPGA or an ASIC. The controller 205 executes processes related to the operations of the information processing apparatus 20 while controlling each part of the information processing apparatus 20.

(Operations of Information Processing System)

Operations of the information processing system 1 illustrated in FIG. 1 are described with reference to FIGS. 1 to 3.

The imaging apparatus 102 of the vehicle 10 continuously captures images of the area in front of the vehicle 10 while the vehicle 10 is traveling. The images captured by the imaging apparatus 102 may be still images or a moving image. In the case of still images, the imaging apparatus 102 successively captures still images at predetermined time intervals.

The memory 106 of the in-vehicle apparatus 103 stores images of the area in front of the vehicle 10 captured by the imaging apparatus 102 while the vehicle 10 is traveling.

While the vehicle 10 is traveling, the receiver 108 continuously receives information regarding the road on which the vehicle 10 is traveling from the ECU 104 that collects information regarding the road on which the vehicle 10 is traveling. The receiver 108 outputs the information, received from the ECU 104, regarding the road on which the vehicle 10 is traveling to the controller 107. The controller 107 acquires the information regarding the road on which the vehicle 10 is traveling from the receiver 108.

While the vehicle 10 is traveling, the receiver 108 continuously receives information on the speed of the vehicle 10 from the ECU 104 that collects information on the speed of the vehicle 10. The receiver 108 outputs the information, received from the ECU 104, on the speed of the vehicle 10 to the controller 107. The controller 107 acquires the information on the speed of the vehicle 10 from the receiver 108.

The controller 107 judges whether the vehicle 10 is traveling in a predetermined section based on the information, acquired from the receiver 108, regarding the road on which the vehicle 10 is traveling. As described above, the predetermined section is a section in which the dynamic sign is installed.

Figure 4A:
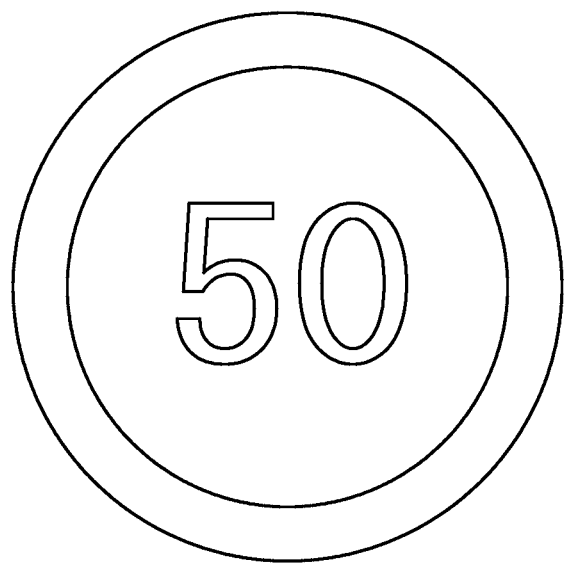
FIG. 4A is a diagram illustrating an example of a dynamic sign.
Figure 4B:
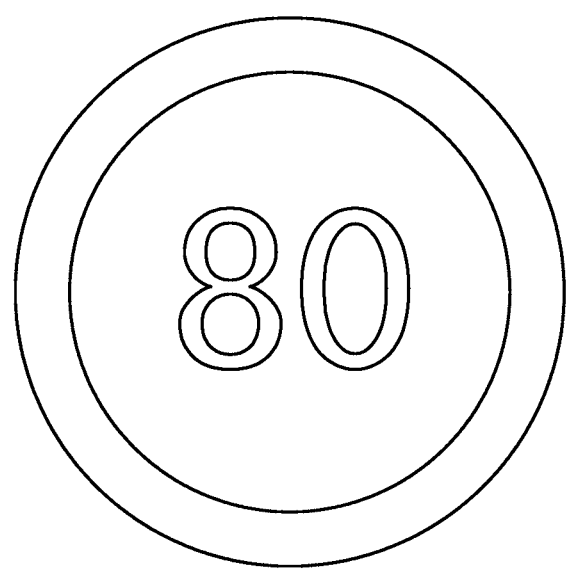
FIG. 4B is a diagram illustrating an example of a dynamic sign.

FIG. 4A and FIG. 4B illustrate examples of a dynamic sign. FIG. 4A and FIG. 4B are examples of a dynamic sign with a variable display of the speed limit. FIG. 4A illustrates a state such that a speed limit of 50 km/h is displayed on the dynamic sign. FIG. 4B illustrates a state such that a speed limit of 80 km/h is displayed on the dynamic sign.

When the vehicle 10 is judged to be traveling in a predetermined section, the controller 107 judges whether a change in speed of the vehicle 10 is equal to or greater than a predetermined threshold based on the information, acquired from the receiver 108, on the speed of the vehicle 10. The predetermined threshold may be a value set in advance and may, for example, be stored in the memory 106. The predetermined threshold may, for example, be 30 km/h.

When the change in speed of the vehicle 10 is judged to be equal to or greater than the predetermined threshold, the controller 107 transmits an image, captured by the imaging apparatus 102 during a predetermined period that includes the time when the judgment was made, to the information processing apparatus 20 via the communication apparatus 101. The predetermined period may be any appropriate period set in advance.

The predetermined period may, for example, be 10 seconds before and after the time when the change in speed is judged to be equal to or greater than the predetermined threshold. In this case, the controller 107 transmits images captured during the 10 seconds before the judgment that the change in speed is equal to or greater than the predetermined threshold, and images captured during the 10 seconds after the judgment that the change in speed is equal to or greater than the predetermined threshold, to the information processing apparatus 20 via the communication apparatus 101.

When transmitting images captured by the imaging apparatus 102 during the predetermined period that includes the time when the change in speed was judged to be equal to or greater than the predetermined threshold, the controller 107 may also transmit information, acquired during the predetermined period, on the speed of the vehicle 10 to the information processing apparatus 20 via the communication apparatus 101.

The communication interface 201 of the information processing apparatus 20 receives the images transmitted by the vehicle 10. The memory 202 stores the images received by the communication interface 201.

The controller 205 performs image analysis on the images acquired from the vehicle 10. The controller 205 performs image analysis as to whether a road sign is included in the images acquired from the vehicle 10.

When it is judged that a road sign is included in an image acquired from the vehicle 10 as a result of the image analysis, the controller 205 performs image analysis as to the number included in the road sign.

When the number included in the road sign changes in the images captured during the predetermined period, the controller 205 judges that the speed limit has changed on the dynamic sign displaying the speed limit.

When it is judged that the speed limit displayed on the dynamic sign has changed, the controller 205 may communicate to a plurality of vehicles 10, via the network 30, that the speed limit has changed. The plurality of vehicles 10 includes the vehicle 10 that has been transmitting images and other vehicles 10. Consequently, a vehicle 10 that can communicate with the network 30 can, in real time, acquire information indicating that the speed limit displayed on the dynamic sign has changed.

When the condition that the vehicle 10 is traveling in a predetermined section and the change in speed of the vehicle 10 is equal to or greater than a predetermined threshold is satisfied in the present embodiment, the controller 107 transmits the images captured during the predetermined period that includes the time when the condition was satisfied to the information processing apparatus 20. The memory 106 may store a condition description file that describes such a condition. In this case, the controller 107 refers to the condition described in the condition description file stored in the memory 106, and when it is judged that the condition is satisfied, the controller 107 transmits the images captured during the predetermined period that includes the time when the judgment was made to the information processing apparatus 20. When the controller 107 includes a storage area, the condition description file may be stored in the storage area of the controller 107.

Figure 5:
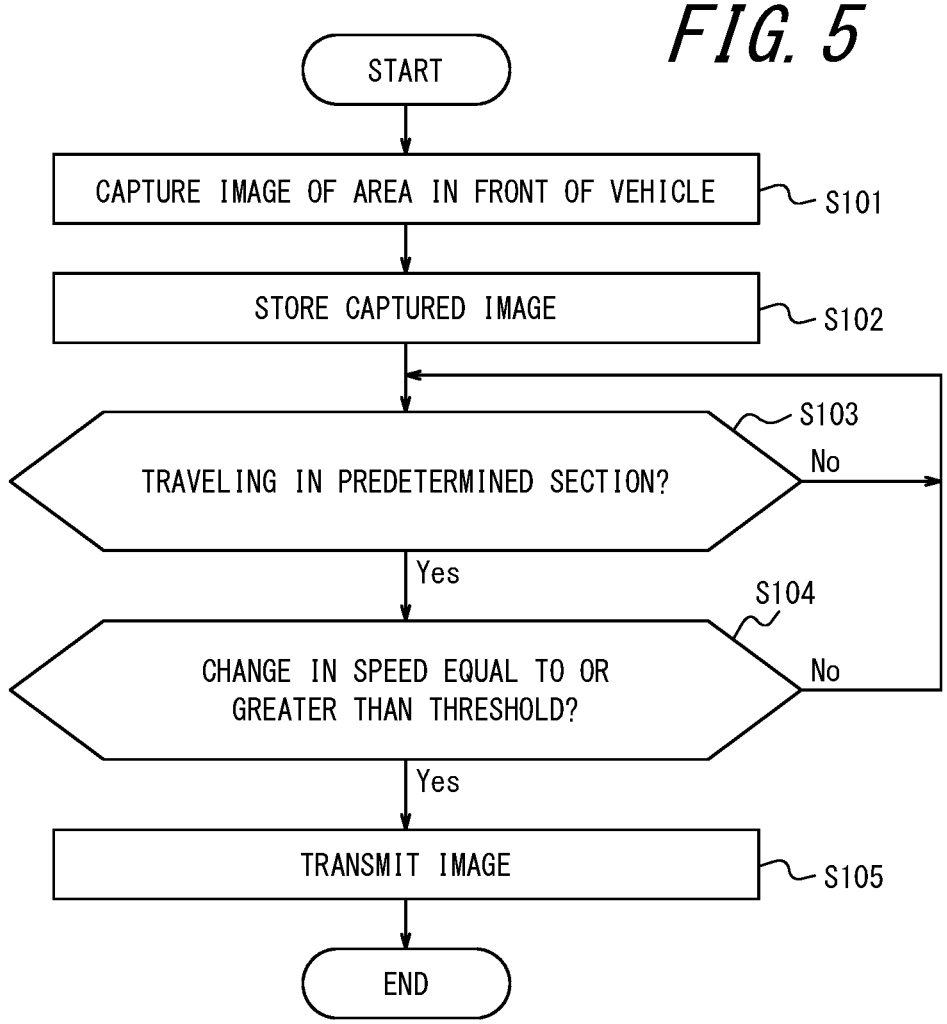
FIG. 5 is a flowchart illustrating operations of an information processing system according to an embodiment of the present disclosure.
Figure 6:
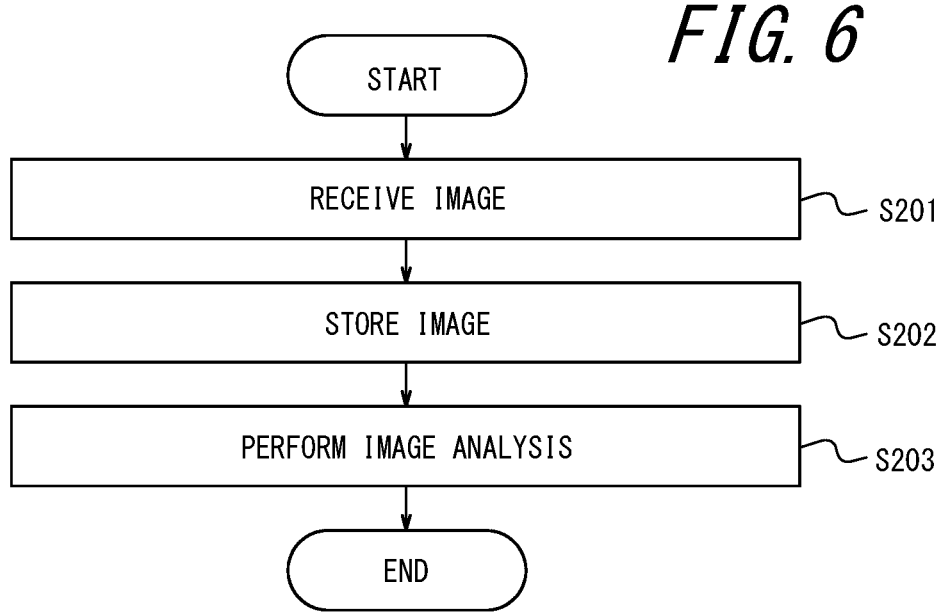
FIG. 6 is a flowchart illustrating operations of an information processing system according to an embodiment of the present disclosure.

Operations of the information processing system 1 are described with reference to the flowchart in FIGS. 5 and 6. FIG. 5 is a flowchart illustrating operations of the vehicle 10. FIG. 6 is a flowchart illustrating operations of the information processing apparatus 20.

First, operations of the vehicle 10 are described with reference to FIG. 5.

In step S101, the imaging apparatus 102 of the vehicle 10 continuously captures images of the area in front of the vehicle 10 while the vehicle 10 is traveling.

In step S102, the memory 106 of the in-vehicle apparatus 103 stores the images, of the area in front of the vehicle 10, that the imaging apparatus 102 continuously captures while the vehicle 10 is traveling.

In step S103, the controller 107 of the in-vehicle apparatus 103 judges whether the vehicle 10 is traveling in a predetermined section. When it is judged that the vehicle 10 is not traveling in a predetermined section, i.e. when step S103 is judged to be No, the controller 107 repeats the process of step S103. When it is judged that the vehicle 10 is traveling in a predetermined section, i.e. when step S103 is judged to be Yes, the controller 107 proceeds to step S104.

In step S104, the controller 107 judges whether the change in speed of the vehicle 10 is equal to or greater than a predetermined threshold. When the change in speed of the vehicle 10 is judged to be less than a predetermined threshold, i.e. when step S104 is judged to be No, the controller 107 returns to step S103. When the change in speed of the vehicle 10 is judged to be equal to or greater than a predetermined threshold, i.e. when step S104 is judged to be Yes, the controller 107 proceeds to step S105.

In step S105, the controller 107 transmits images, captured by the imaging apparatus 102 during a predetermined period that includes the time when the change in speed was judged to be equal to or greater than the predetermined threshold, to the information processing apparatus 20 via the communication apparatus 101.

Next, operations of the information processing apparatus 20 are described with reference to FIG. 6.

In step S201, the communication interface 201 of the information processing apparatus 20 receives the images transmitted by the vehicle 10 in step S105 of FIG. 5.

In step S202, the memory 202 of the information processing apparatus 20 stores the images received by the communication interface 201.

In step S203, the controller 205 of the information processing apparatus 20 performs image analysis on the images received from the vehicle 10. When it is judged, as a result of image analysis, that the speed limit displayed on the dynamic sign has changed, the controller 205 may communicate that the speed limit has changed to a plurality of vehicles 10 via the network 30.

When it is judged, in the information processing method according to the present embodiment, that a change in speed equal to or greater than a threshold has occurred while the vehicle 10 is traveling in a predetermined section, the vehicle 10 transmits images, captured during a predetermined period that includes when the judgment was made, to the information processing apparatus 20, as described above. In this way, in the information processing method according to the present embodiment, the vehicle 10 does not transmit all of the images captured during travel to the information processing apparatus 20, but rather transmits captured images to the information processing apparatus 20 only when a predetermined condition is satisfied. The information processing method according to the present embodiment can thereby reduce the communication load between the vehicle 10 and the information processing apparatus 20. Furthermore, in the information processing method according to the present embodiment, the capacity necessary for the memory 202 of the information processing apparatus 20 to store the images captured by the vehicle 10 can be reduced. The information processing method according to the present embodiment can therefore improve technology for transmitting images captured while the vehicle 10 is traveling.

The present disclosure is not limited to the embodiments described above. For example, a plurality of blocks described in the block diagrams may be integrated, or a block may be divided. Instead of executing the plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, some of the processing operations executed in the vehicle 10 in the above embodiment may be executed in the information processing apparatus 20. Also, some of the processing operations executed in the information processing apparatus 20 in the above embodiment may be executed in the vehicle 10.

For example, a configuration that causes a general purpose electronic device such as a smartphone, a computer, or the like to function as the information processing apparatus 20 according to the embodiment described above is possible. Specifically, a program containing processes for realizing the functions of the information processing apparatus 20 or the like according to an embodiment may be stored in a memory of the electronic device, and the program may be read and executed by a processor of the electronic device. Accordingly, in an embodiment, the present disclosure can also be implemented as a program executable by a processor.

The invention claimed is:

1. An information processing method for a vehicle, the information processing method comprising:
   capturing and storing images of an area in front of the vehicle;
   acquiring information on a speed of the vehicle; and
   transmitting an image to a computer in response to a judgment being made that a change in measured vehicle speed equal to or greater than a threshold occurs while the vehicle is traveling in a predetermined section, the image being captured during a predetermined period that includes a time at which the judgment was made.

2. The information processing method of claim 1, wherein the predetermined section is a section in which a dynamic sign is installed.

3. The information processing method of claim 1, further comprising transmitting information on a speed acquired during the predetermined period to the computer together with the image captured during the predetermined period.

4. The information processing method of claim 1, wherein the capturing and storing images of the area in front of the vehicle comprises continuously capturing and storing images of the area in front of the vehicle while the vehicle is traveling.

5. A non-transitory computer readable medium storing a program configured to cause an in-vehicle apparatus mounted in the vehicle to execute the information processing method of claim 1.

6. The non-transitory computer readable medium of claim 5, wherein the predetermined section is a section in which a dynamic sign is installed.

7. The non-transitory computer readable medium of claim 5, wherein the information processing method further comprises transmitting information on a speed acquired during the predetermined period to the computer together with the image captured during the predetermined period.

8. The non-transitory computer readable medium of claim 5, wherein the capturing and storing images of the area in front of the vehicle comprises continuously capturing and storing images of the area in front of the vehicle while the vehicle is traveling.

9. An in-vehicle apparatus comprising:
   a memory configured to store images, captured by a camera mounted in a vehicle, of an area in front of the vehicle;
   a receiver configured to receive information on a speed of the vehicle; and
   a controller configured to judge whether a change in measured vehicle speed equal to or greater than a threshold occurs while the vehicle is traveling in a predetermined section, wherein
   when a judgment is made that a change in measured vehicle speed equal to or greater than the threshold occurs, the controller transmits an image captured during a predetermined period that includes a time when the judgment is made to a computer.

10. The in-vehicle apparatus of claim 9, wherein the predetermined section is a section in which a dynamic sign is installed.

11. The in-vehicle apparatus of claim 9, wherein the controller is configured to transmit information on a speed acquired during the predetermined period to the computer together with the image captured during the predetermined period.

12. A vehicle comprising the in-vehicle apparatus of claim 9.

13. An information processing system comprising:
   the in-vehicle apparatus of claim 9, the computer, wherein the computer further comprises:
   a communication interface configured to communicate with the in-vehicle apparatus; and
   a second controller configured to perform image analysis, upon acquiring an image of the area in front of the vehicle from the vehicle via the communication interface, as to whether a road sign is included in the image.

* * * * *